(12) United States Patent
Martinis et al.

(10) Patent No.: US 11,244,240 B2
(45) Date of Patent: Feb. 8, 2022

(54) FIDELITY ESTIMATION FOR QUANTUM COMPUTING SYSTEMS

(71) Applicant: Google LLC, Mountain View, CA (US)

(72) Inventors: John Martinis, Santa Barbara, CA (US); Nan Ding, Los Angeles, CA (US); Ryan Babbush, Venice, CA (US); Sergei V. Isakov, Zurich (CH); Hartmut Neven, Malibu, CA (US); Vadim Smelyanskiy, Mountain View, CA (US); Sergio Boixo Castrillo, Rancho Palos Verdes, CA (US)

(73) Assignee: Google LLC, Mountain View, CA (US)

( * ) Notice: Subject to any disclaimer, the term of this patent is extended or adjusted under 35 U.S.C. 154(b) by 455 days.

(21) Appl. No.: 16/301,863

(22) PCT Filed: May 17, 2016

(86) PCT No.: PCT/US2016/032917
§ 371 (c)(1),
(2) Date: Nov. 15, 2018

(87) PCT Pub. No.: WO2017/200536
PCT Pub. Date: Nov. 23, 2017

(65) Prior Publication Data
US 2019/0156239 A1   May 23, 2019

(51) Int. Cl.
*G06N 10/00* (2019.01)

(52) U.S. Cl.
CPC .................. *G06N 10/00* (2019.01)

(58) Field of Classification Search
None
See application file for complete search history.

(56) References Cited

FOREIGN PATENT DOCUMENTS

| WO | WO 2015/103375 | 7/2015 |
|----|----------------|--------|
| WO | WO 2016/044917 | 3/2016 |

OTHER PUBLICATIONS

Ball et al. "Effect of noise correlations on randomized benchmarking", Phys. Rev A, vol. 93, Art. 022303; published Feb. 1, 2016 (Year: 2016).*

Ball et al. "Effect of noise correlations on randomized benchmarking," Physical Review A, vol. 93, Feb. 1, 2016, 23 pages.

Barends et al. "Digitized adiabatic quantum computing with a superconducting circuit," arXiv 1511.03316v1, Nov. 10, 2015, 19 pages.

(Continued)

*Primary Examiner* — Jay C Chang
(74) *Attorney, Agent, or Firm* — Fish & Richardson P.C.

(57) ABSTRACT

Methods and apparatus for estimating the fidelity of quantum hardware. In one aspect, a method includes accessing a set of quantum gates; sampling a subset of quantum gates from the set of quantum gates, wherein the subset of quantum gates defines a quantum circuit; applying the quantum circuit to a quantum system and performing measurements on the quantum system to determine output information of the quantum system; calculating output information of the quantum system based on application of the quantum circuit to the quantum system; and estimating a fidelity of the quantum circuit based on the determined output information and the calculated output information of the quantum system.

14 Claims, 6 Drawing Sheets

(56) References Cited

OTHER PUBLICATIONS

Ferrie. "Quantum model averaging,", New Journal of Physics, vol. 16, Sep. 24, 2014, 17 pages.
Flammia et al. "Direct fidelity estimation from few Pauli measurements," arXiv 1104.4695v3, Apr. 30, 2011, 9 pages.
Fogarty et al. "Nonexponential fidelity decay in randomized benchmarking with low-frequency noise," Physical Review A. vol. 92, Aug. 11, 2015, 7 pages.
Knill et al. "Randomized Benchmarking of Quantum Gates", National Institute of Standards and Technology, arXiv:0707.0963v1, May 28, 2018, 13 pages.
Li et al. "Some geometric interpretations of quantum fidelity," Linear Algebra and its Application, vol. 487(18), Sep. 18, 2015, 14 pages.
PCT International Search Report and Written Opinion issued in International Application No. PCT/US2016/032917, dated Mar. 2, 2017, 14 pages.
PCT Written Opinion issued in International Application No. PCT/US2016/032917, dated Apr. 26, 2018, 8 pages.
AU Office Action in Australian Application No. 2016407222, dated Jan. 13, 2020, 3 pages.
Carignan-Dugas et al., "Characterizing universal gate sets via dihedral benchmarking", arXiv, Aug. 2015, 5 pages.
SG Written Opinion in Singaporean Application No. 11201810221Y, dated Jan. 6, 2020, 5 pages.
JP Office Action in Japanese Application No. 2020-22321, dated Mar. 1, 2021, 4 pages (with English translation).
AU Office Action in Australian Application No. 2016407222, dated Jun. 28, 2019, 6 pages.
Gilchrist et al, "Distance measures to compare real and ideal quantum processes" arXiv, Jan. 2009, 15 pages.
O'Brien et al, "Quantum process tomography of a controlled-NOT gate", arXiv, Aug. 2004, 4 pages.
White et al, "Measuring Two-Qubit Gates" J. Opt. Soc. Am. B, Feb. 2007, 12 pages.
AU Office Action in Australian Application No. 2016407222, dated Mar. 10, 2020, 3 pages.
CA Office Action in Canadian Application No. 3,024,197, dated Nov. 4, 2019, 4 pages.
CA Office Action in Canadian Application No. 3,024,197, dated Jul. 23, 2021, 4 pages.
EP Office Action in European Application No. 16725717.9, dated Jun. 1, 2021, 7 pages.

\* cited by examiner

FIDELITY ESTIMATION FOR QUANTUM COMPUTING SYSTEMS

BACKGROUND

This specification relates to quantum computing.

Quantum circuits are models for quantum computation in which a computation includes a sequence of quantum gates. Quantum circuits are sensitive to errors, e.g., due to decoherence and other quantum noise. The effect of errors in a quantum circuit may be characterized by the fidelity of the quantum circuit. Fidelity is a metric of quantum circuits that indicates the quality and reliability of a quantum circuit.

SUMMARY

This specification relates to estimating the fidelity of quantum hardware in quantum computing systems. In particular, this specification describes technologies for estimating the fidelity of complex, non-Clifford quantum circuits with multiple qubits.

In general, one innovative aspect of the subject matter described in this specification can be implemented in a method that includes the actions of accessing a set of quantum gates, sampling a subset of quantum gates from the set of quantum gates, wherein the subset of quantum gates defines a quantum circuit, applying the quantum circuit to a quantum system and performing measurements on the quantum system to determine output information of the quantum system, calculating output information of the quantum system based on application of the quantum circuit to the quantum system, and estimating a fidelity of the quantum circuit based on the determined output information and the calculated output information of the quantum system.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations estimating a fidelity of the quantum system comprises fitting the determined output information of the quantum system to the calculated output information of the quantum system.

In some cases fitting the determined output information of the quantum system to the calculated output information of the quantum system to estimate the fidelity of the quantum circuit comprises: defining a convex combination of the calculated output information of the quantum system and a totally mixed quantum state; and estimating the fidelity of the quantum circuit by comparing the defined convex combination with the determined output information of the quantum system.

In some implementations the convex combination is given by $$\rho = \alpha |\psi\rangle\langle\psi| + (1-\alpha)\frac{\mathbb{1}}{N}$$

wherein $\alpha$ represents the fidelity of the quantum circuit, $|\psi\rangle$ represents a calculated quantum state of the quantum system based on application of the quantum circuit to the quantum system, and $\mathbb{1}/N$ represents the totally mixed state.

In some cases the method further comprises repeatedly sampling a subset of quantum gates from the set of quantum gates until completion of an event, wherein each subset of quantum gates defines a respective quantum circuit; for each sampled subset of quantum gates: applying the respective quantum circuit to a quantum system and performing respective measurements on the quantum system to determine output information of the quantum system; calculating output information of the quantum system based on application of the respective quantum circuit to the quantum system; and estimating a fidelity of the respective quantum circuit based on the determined output information and the calculated output information of the quantum system.

In some implementations the completion of the event occurs when an uncertainty of an estimated fidelity is below a predetermined threshold.

In some cases the set of quantum gates comprises a universal set of quantum gates.

In some cases the set of quantum gates comprise single qubit quantum gates and two qubit quantum gates.

In some implementations each gate in the set of quantum gates is associated with a respective quantum gate fidelity.

In other implementations the sampled subset of quantum gates comprises a same number of quantum gates of comparable respective quantum gate fidelity.

In some cases sampling a subset of quantum gates from the set of quantum gates comprises randomly sampling a subset of quantum gates from the set of quantum gates.

The subject matter described in this specification can be implemented in particular ways so as to realize one or more of the following advantages.

Quantum hardware, e.g., a system of quantum gates, is inherently prone to errors that need to be characterized before they can be corrected. Full characterization via processes such as quantum process tomography are impractical, e.g., in terms of computational cost and efficiency. For example, quantum process tomography becomes prohibitive as the number of qubits in the quantum system grows because the number of required measurements grows exponentially. In addition, full characterization is often unnecessary since for practical purposes, it may be enough to estimate more general quantities such as the average fidelity.

Alternative methods for characterizing errors include using a restrictive set of quantum gates in the quantum hardware. For example, randomized benchmarking with Clifford gates is a widely extended method to measure the fidelity of single qubit gates and two-qubit gates. However, such techniques cannot be applied to directly measure the fidelity of quantum circuits which employ a universal quantum gate set. The results obtained using such methods may therefore not be of immediate interest or considered illustrative and impractical since the quantum states produced by these restrictive families of circuits may be very different in important aspects to quantum states produced by circuits with universal quantum gates. For example, Clifford circuits may always be efficiently simulated using classical computers, and do not exhibit the Porter-Thomas distribution.

As the complexity and variety of quantum hardware grows, it is imperative to measure the circuit fidelity for quantum circuits that are not of a type which can be simulated easily and efficiently by classical computers.

A system implementing fidelity estimation for quantum computing systems as described in this specification is able to estimate the fidelity of increasingly complex quantum hardware.

A system implementing fidelity estimation for quantum computing systems as described in this specification is applicable to both digital models of quantum computation and analog models of quantum computation. In the case of digital models of quantum computation, the system does not require the use of a restrictive set of quantum gates. For example, the system may utilize complex random quantum circuits composed of gates chosen from a universal set of quantum gates, thus allowing for direct measurement of the quantum circuit fidelity for increasingly complex quantum circuits with an increasing number of qubits and quantum gates. Similarly, in the case of analog models of quantum computation, the system allows for directly determining the fidelity of quantum hardware implementing continuous Hamiltonian evolution.

Unlike other systems and methods for estimating the fidelity of a quantum circuit, a system implementing fidelity estimation for quantum computing systems as described in this specification enables the fidelity of a quantum circuit to be estimated without requiring that a number of measurements exponential in the number of qubits be performed.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes methods and systems for fidelity benchmarking for quantum hardware, e.g., quantum circuits. A random instance of a quantum circuit from a given universal family of available quantum gates is selected, and the statistics of the selected quantum circuit for a chosen measurement are numerically calculated using classical simulation. A sequence of runs of the same quantum circuit is performed and measurements on the quantum hardware are performed. The fidelity of the quantum circuit is estimated using the numerically obtained expected statistics and experimentally determined statistics.

Example Operating Environment

Figure 1A:
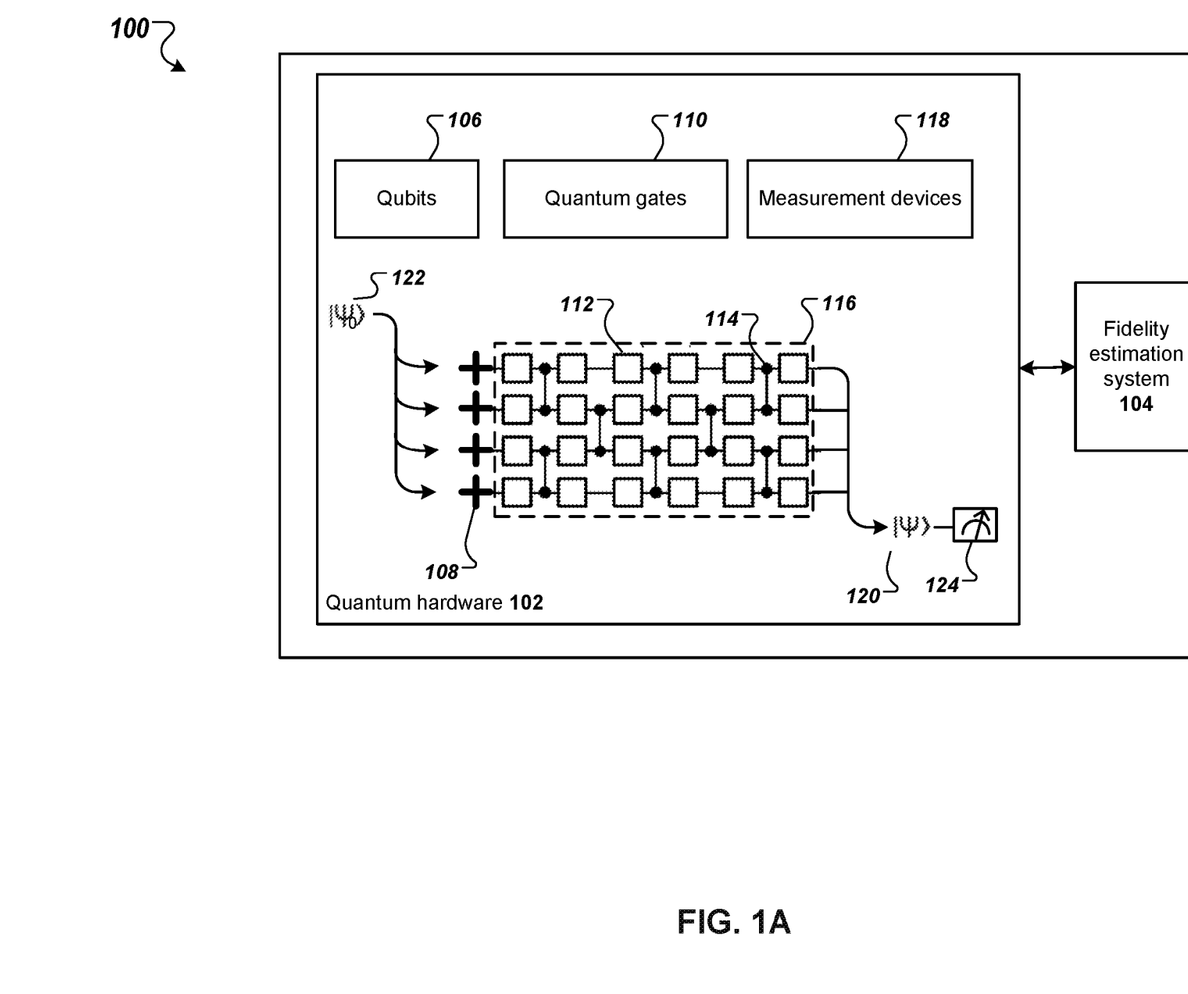
FIGS. 1A and 1B depict example systems for fidelity estimation.

FIG. 1A depicts an example system 100 for fidelity estimation. The example system 100 is an example of a system implemented as classical or quantum computer programs on one or more classical computers or quantum computing devices in one or more locations, in which the systems, components, and techniques described below can be implemented.

The system includes quantum hardware 102 in communication with a fidelity estimation system 104. The quantum hardware 102 includes a quantum system that may include one or more qubits 106, e.g., qubit 108. The one or more qubits may be used to perform algorithmic operations or quantum computations. The specific realization of the one or more qubits depends on the type of algorithmic operations or quantum computations that the quantum computing device is performing. For example, the qubits may include qubits that are realized via atomic, molecular or solid-state quantum systems. In other examples the qubits may include, but are not limited to, superconducting qubits or semi conducting qubits. For clarity, four qubits are depicted in FIG. 1A, however the system may include a smaller or larger number of qubits.

Each of the one or more qubits 106 may interact with one or more other qubits, e.g., through respective controllable couplings. In some examples the one or more qubits 106 may be subject to nearest neighbor interactions.

The one or more qubits 106 may be arranged in a variety of ways. The specific arrangement of the one or more qubits may depend on the algorithmic operation or quantum computation that the qubits are being used to perform. In some examples the qubits may be arranged in a one-dimensional array, e.g., a chain. In other examples the qubits may be arranged in a two-dimensional array, e.g., a lattice. For clarity, four qubits are depicted in a one-dimensional array in FIG. 1, however the system may arrange the qubits in other fashions.

The quantum hardware 102 includes a set of quantum gates 110. The set of quantum gates 110 includes single qubit gates, e.g., quantum gate 112, and two-qubit gates, e.g., quantum gate 114. Single qubit quantum gates are quantum gates that operate on a single qubit. Example single qubit gates include but are not limited to Hadamard gates, Pauli X, Y or Z gates, or phase shift gates. Two-qubit quantum gates are quantum gates that operate on two qubits. Example two-qubit gates include but are not limited to swap gates, controlled gates, Toffoli gates or Fredkin gates.

The set of quantum gates 110 may include a universal set of quantum gates. A universal set of quantum gates is a set of gates to which any computational operation possible on a quantum computing device can be reduced. For example, one example of a universal set of single and two-qubit quantum gates includes a Hadamard gate, $\pi/8$ gate and controlled NOT gate.

The set of quantum gates 110 may be sampled to define one or more quantum circuits, e.g., quantum circuit 116. For clarity, quantum circuit 116 includes a fixed number of representative quantum gates, e.g., quantum gates 112 and 114, however a quantum circuit defined by a sampled set of quantum gates may include more or fewer quantum gates in varying arrangements.

The sampled quantum circuit 116 receives as input a quantum system, e.g., one or more qubits, prepared in an initial state 122, e.g., a ground state. The quantum circuit operates on the quantum system and outputs the quantum system in a final state 120, wherein the final state is determined by the operations performed on the quantum system by the quantum circuit.

Each quantum gate in the set of quantum gates 110 and each quantum circuit defined by subsets of the set of quantum gates 110 is associated with a respective gate fidelity or quantum circuit fidelity. A quantum gate fidelity and quantum circuit fidelity indicates a measure of how reliably the gate or circuit transforms an input into an expected output. For example, a Pauli X quantum gate acts on a single qubit and maps a zero state to a one state, and a one state to a zero state. A fidelity of a Pauli X gate may include a number between 0 and 1 that indicates how accurately and reliably the mapping is achieved, e.g., whether the gate reliably maps a zero state to a one state and vice versa.

The quantum hardware 102 includes one or more measurement devices 118, e.g., measurement device 124. The measurement devices 118 may operate on the quantum system to determine properties of the quantum system, e.g., measurement device 124 operates on the quantum system in the final state 120.

The fidelity estimation system 104 may include a classical or quantum processing device and communicates with the quantum hardware 102. The fidelity estimation system 104 may be configured to access the set of quantum gates 110 and sample a subset of quantum gates from the set of quantum gates 110 to define a respective quantum circuit, e.g., quantum circuit 116. The fidelity estimation system 104 may cause a defined quantum circuit to be repeatedly applied to a quantum system, e.g., one or more qubits 106, and perform respective measurements on the quantum system to determine output information, e.g., statistics, of a quantum system using one or more measurement devices 118.

The fidelity estimation system 104 may be configured to calculate output information, e.g., expected statistics, of the quantum system based on application of the quantum circuit to the quantum system, e.g., after application of a defined quantum circuit on the quantum system, and to fit determined output information of the quantum system to the calculated output information of the quantum system to estimate a fidelity of the quantum circuit. Estimating a fidelity of a quantum circuit is described in more detail below with reference to FIGS. 2 and 3.

Figure 1B:
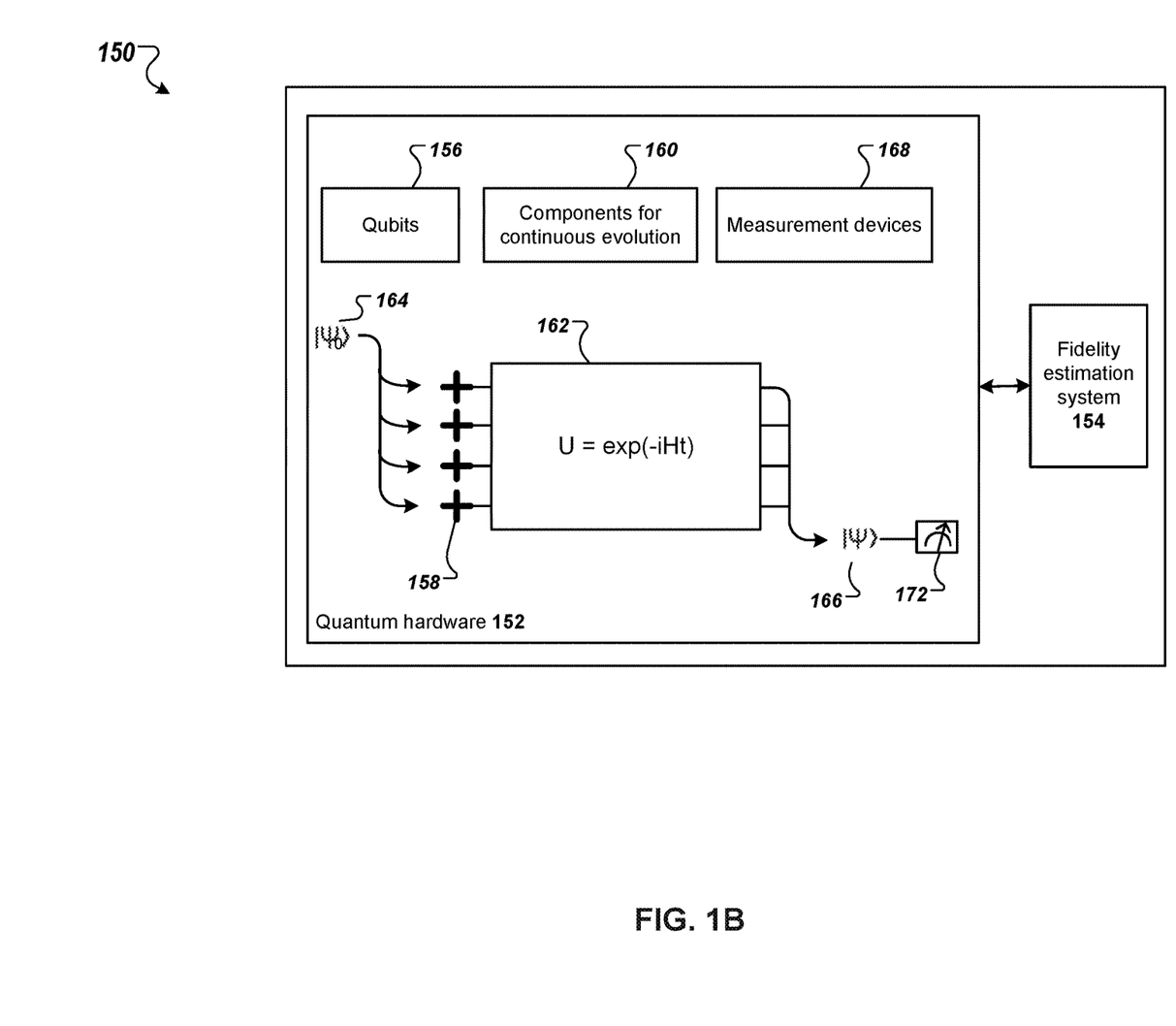

FIG. 1B depicts an example system 150 for fidelity estimation. The example system 150 is an example of a system implemented as classical or quantum computer programs on one or more classical computers or quantum computing devices in one or more locations, in which the systems, components, and techniques described below can be implemented.

The system includes quantum hardware 152 in communication with a fidelity estimation system 154. The quantum hardware 152 includes a quantum system that may include one or more qubits 156, e.g., qubit 158. As described above with reference to FIG. 1A, the one or more qubits may be used to perform algorithmic operations or quantum computations. The specific realization of the one or more qubits depends on the type of algorithmic operations or quantum computations that the quantum computing device is performing. For example, the qubits may include qubits that are realized via atomic, molecular or solid-state quantum systems. In other examples the qubits may include, but are not limited to, superconducting qubits or semi conducting qubits. For clarity, four qubits are depicted in FIG. 1B, however the system may include a smaller or larger number of qubits.

Each of the one or more qubits 156 may interact with one or more other qubits, e.g., through respective controllable couplings. In some examples the one or more qubits 156 may be subject to nearest neighbor interactions.

The one or more qubits 156 may be arranged in a variety of ways. The specific arrangement of the one or more qubits may depend on the algorithmic operation or quantum computation that the qubits are being used to perform. In some examples the qubits may be arranged in a one-dimensional array, e.g., a chain. In other examples the qubits may be arranged in a two-dimensional array, e.g., a lattice. For clarity, four qubits are depicted in a one-dimensional array in FIG. 1, however the system may arrange the qubits in other fashions.

The quantum hardware 152 includes one or more components for performing continuous Hamiltonian evolution 160. The one or more components for performing continuous Hamiltonian evolution 160 implement one or more Hamiltonians, which in turn may determine a unitary operator that defines the evolution of the quantum system on which it is applied. For example, the components 160 may implement a Hamiltonian H, which in turn gives rise to the unitary operator 162. The unitary operator 162 defines an evolution of the quantum system prepared in initial state 164, resulting in a final state of the quantum system 166.

Each continuous Hamiltonian evolution of the quantum system is associated with a respective quantum hardware fidelity. Quantum hardware fidelity indicates a measure of how reliably the hardware transforms an input into an expected output, as described above with reference to FIG. 1A.

The quantum hardware 152 includes one or more measurement devices 168, e.g., measurement device 172. The measurement devices 168 may operate on the quantum system to determine properties of the quantum system, e.g., measurement device 172 operates on the quantum system in the final state 166.

The fidelity estimation system 154 may include a classical or quantum processing device and communicates with the quantum hardware 152. The fidelity estimation system 154 may be configured to access the quantum hardware 152 and select components for particular continuous Hamiltonian evolutions 160. The fidelity estimation system 154 may cause the quantum hardware to repeatedly perform a continuous Hamiltonian evolution corresponding to selected components on the quantum system, e.g., the one or more qubits 156, and perform respective measurements on the quantum system to determine output information of the quantum system.

The fidelity estimation system 154 may be configured to calculate output information of the quantum system based on performing the selected continuous Hamiltonian evolution on the quantum system and fit the determined output information of the quantum system to the calculated output information of the quantum system to estimate the fidelity of the quantum hardware. Estimating a fidelity of quantum hardware is described in more detail below with reference to FIGS. 4 and 5.

Programming the Hardware

Figure 2:
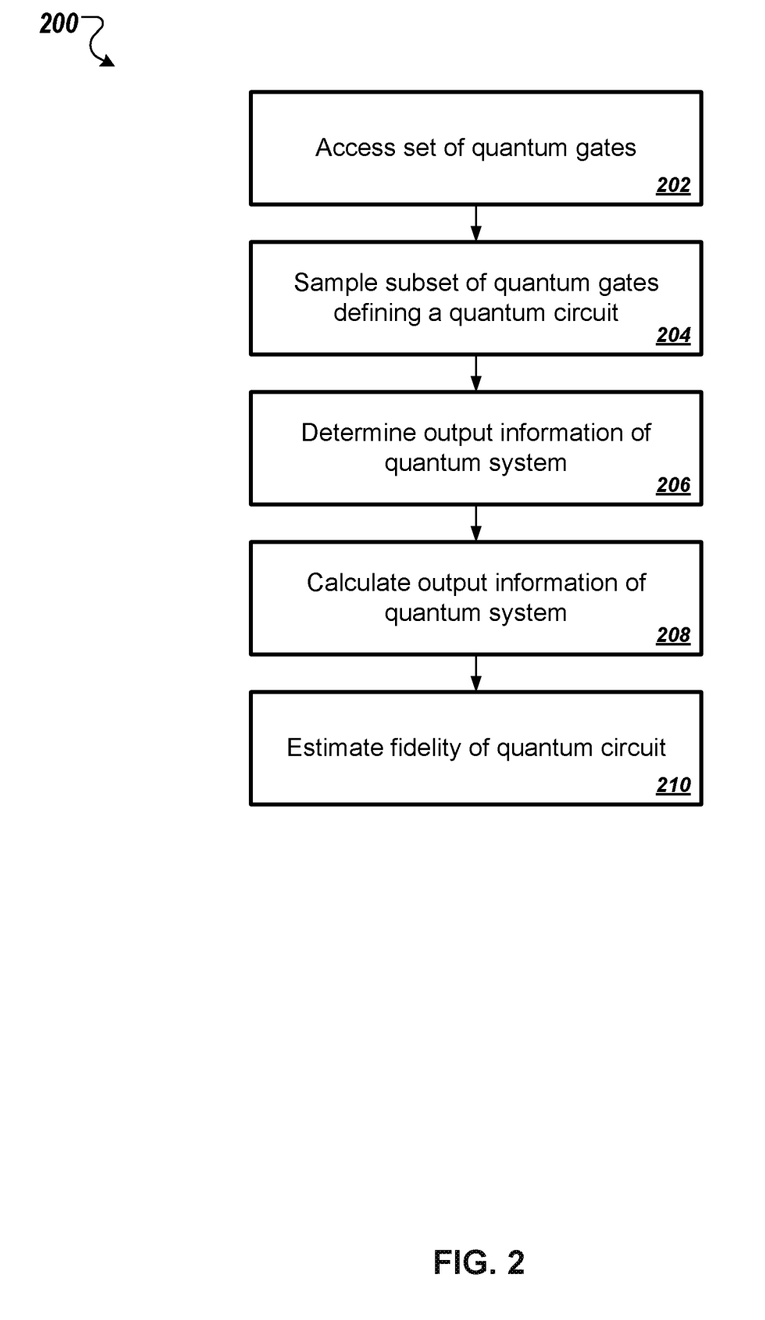
FIG. 2 is a flow diagram of an example process for benchmarking the fidelity of a quantum circuit.

FIG. 2 is a flowchart of an example process 200 for benchmarking the fidelity of a quantum circuit. For convenience, the process 200 will be described as being performed by a system of one or more classical or quantum computing devices located in one or more locations. For example, a quantum computing system, e.g., the quantum computing system 100 of FIG. 1A, appropriately programmed in accordance with this specification, can perform the process 200.

The system accesses a set of quantum gates (step 202). The set of quantum gates may include one or more single qubit gates. Each quantum gate in the set of quantum gates may be associated with a respective quantum gate fidelity. The set of quantum gates may include one or more two-qubit gates. Example single and two-qubit gates are described above with reference to FIG. 1A. In some implementations the set of quantum gates includes a universal set of quantum gates. Universal sets of quantum gates are described above with reference to FIG. 1A.

The system samples a subset of quantum gates from the set of quantum gates (step 204). In some implementations the system may randomly sample a subset of quantum gates from the set of quantum gates. The sampled subset of quantum gates defines a quantum circuit. For example, by randomly sampling a subset of quantum gates from the available set of quantum gates the system produces a random instance of a quantum circuit.

In some implementations the system may repeatedly sample subsets of quantum gates from the set of quantum gates, where each sampled subset defines a respective quantum circuit. The system may sample subsets of quantum gates that include a same number of quantum gates of comparable respective quantum gate fidelity, e.g., the instance of the quantum circuit defined by the sampled subset of quantum gates may include a same number of quantum gates of comparable quantum gate fidelity. By sampling subsets of quantum gates that include a same number of quantum gates of comparable respective quantum gate fidelity, the system is able to improve the consistency of the results obtained by the process 200 and avoid large systematic errors.

The system applies the quantum circuit to a quantum system and performs measurements on the quantum system to determine output information, e.g., statistics of the quantum system (step 206). For example, the system may include or otherwise access a quantum system, e.g., a quantum system including one or more qubits as illustrated in FIG. 1A, and repeatedly apply the quantum circuit defined by the sampled subset of quantum gates to an initialized state of the quantum system. For each application of the quantum circuit, the system may perform respective measurements on the quantum system and use the measurement results to determine output information of the quantum system. As an example, the system may sample a subset of quantum gates that define a respective quantum circuit, and perform m runs of the quantum circuit on a quantum system of interest to obtain a sequence of bit-strings $\{x_1, x_2, \ldots, x_m\}$ measured in the computational basis.

As described above, in some implementations the system may repeatedly sample subsets of quantum gates from the set of quantum gates, where each sampled subset defines a respective quantum circuit. In such cases the system may repeatedly applies each sampled quantum circuit to the quantum system and performs respective measurements on the quantum system to determine respective statistics of the quantum system for each of the sampled circuits.

The system calculates output information, e.g., expected, e.g., exact or ideal, statistics, of the quantum system based on application of the quantum circuit to the quantum system (step 208). For example, the system may use available computing technology, e.g., classical computing technology, to calculate the output information of the quantum system after application of the quantum circuit to the quantum system.

Continuing the example above, in order to determine output information of the quantum system the system may calculate a set of probabilities $\{p(y_j)\}$ that correspond to the probability of obtaining each possible bit string $y_j$. As described above with reference to step 204, in some implementations the system may repeatedly sample subsets of quantum gates from the set of quantum gates, where each sampled subset defines a respective quantum circuit. In such cases the system may calculate a set of probabilities that correspond to the probability of obtaining each possible bit string for each sampled quantum circuit.

The system estimates a fidelity of the quantum circuit based on the determined output information and the calculated output information of the quantum system (step 210). The system may estimate the fidelity of the quantum circuit by fitting the determined output information of the quantum system to the calculated output information of the quantum system. The system may fit the results of performing the measurements in step 206 to a statistical mixture of (i) the output information of the quantum system based on application of the quantum circuit to the quantum system as calculated in step 208, and (ii) a totally mixed quantum state. Fitting determined output information of a quantum system to calculated output information of the quantum system to estimate a fidelity of a quantum circuit is described in more detail below with reference to FIG. 3.

In cases where the system repeatedly samples subsets of quantum gates to define multiple quantum circuits, the system fits the respective determined output information for the quantum system to the respective calculated output information of the quantum system to estimate a respective fidelity of each quantum circuit. The system may repeatedly sample subsets of quantum gates from the set of quantum gates until completion of an event, e.g., when an uncertainty of an estimated fidelity is below a predetermined threshold. By increasing the number of repetitions, the uncertainty of the estimated fidelity may be reduced, e.g., following an inverse square root law in the number of repetitions, to a desired threshold of certainty.

Figure 3:
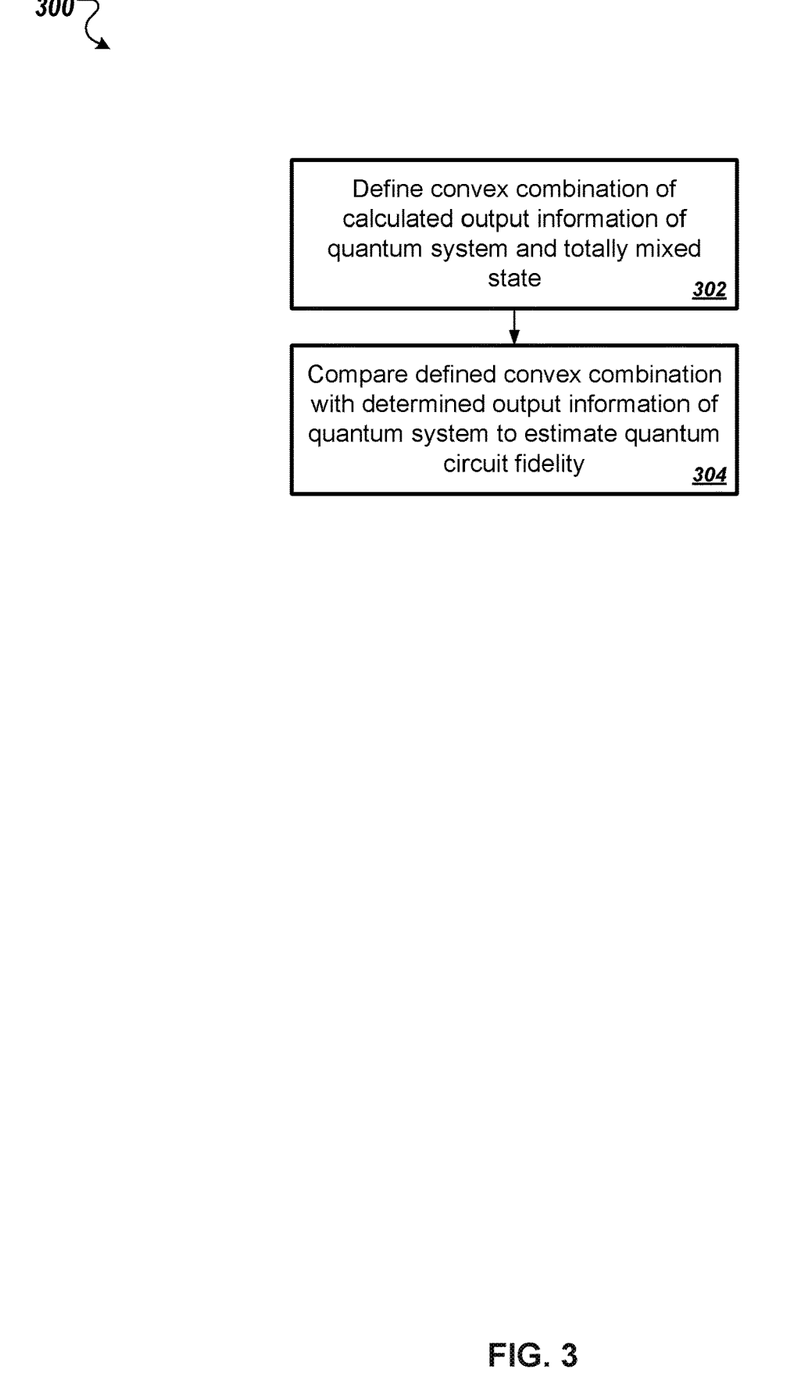
FIG. 3 is a flow diagram of an example process for fitting determined output information of a quantum system to calculated output information of the quantum system to estimate a fidelity of a quantum circuit.

FIG. 3 is a flowchart of an example process 300 for fitting determined output information, e.g., statistics, of a quantum system to calculated output information, e.g., statistics, of the quantum system to estimate a fidelity of a quantum circuit. For convenience, the process 300 will be described as being performed by a system of one or more classical or quantum computing devices located in one or more locations. For example, one or more classical processors, e.g., classical processors 104 of FIG. 1A, appropriately programmed in accordance with this specification, can perform the process 300.

The system defines a convex combination of the calculated output information of the quantum system described above with reference to step 208 of FIG. 2 and a totally mixed quantum state (step 302). For example, the convex combination may be given by equation (1) below.

$$\rho = \alpha |\psi\rangle\langle\psi| + (1-\alpha)\frac{\mathbb{I}}{N} \quad (1)$$

In equation (1), $\alpha$ represents the fidelity of the quantum circuit, $|\psi\rangle$ represents a calculated quantum state of the quantum system based on application of the quantum circuit to the quantum system, and $\mathbb{1}/N$ represents the totally mixed state with N a dimension of the Hilbert space containing $|\psi\rangle$.

The system estimates the fidelity of the quantum circuit by comparing the defined convex combination in equation (1) with the determined output information of the quantum system described above with reference to step 206 of FIG. 2 (step 304). For example, the system may estimate the fidelity of the quantum circuit by comparing the defined convex combination with the determined output information of the quantum system and solving for the parameter $\alpha$.

Continuing the example provided above in FIG. 2, the system may numerically calculate the quantity $$c = \frac{1}{m}\sum_{j=1}^{m} \ln(p(x_j))$$

for each sampled subset of quantum gates for a corresponding experimentally obtained sequence of bit-strings $\{x_1, x_2, \ldots x_m\}$. Under certain assumptions, e.g., assuming that the quantum circuit is long enough (the depth of the circuit may grow no faster than $n^{1/D}$, up to a possible correction in log(n), where n is the number of qubits and D is the dimension of the qubit array, e.g., D=1 and depth=n for a 1D array of qubits, as depicted in FIG. 1A, or D may be infinite with constant depth or depth logarithmic in n for hypothetical configurations where two qubit gates are performed between any pairs of qubits), the parameter $\alpha$, e.g., the quantum circuit fidelity, may be estimated by $\alpha=c+\ln(N)+\gamma$ where $\gamma$ is the Euler constant and c is defined above. In some implementations the error in the estimation of $\alpha$ may be given by $k/m^{1/2}$, where $k \cong 1$. This may represent a number of required measurements, and is independent of the number of qubits.

In some implementations the system may estimate a fidelity of a quantum circuit through numerical comparison with any number of statistical aggregates. For example, instead of using the quantity $\Sigma_{j=1}^{m} \ln(p(x_j))$ as in the above, the system may use the quantity $\Sigma_{j=1}^{m} p(x_j)^2$, e.g., the sum of the squares of the probabilities. Other quantities may also be used. An essential requirement is that the quantity be a statistical aggregate that may be computed using a simulation of the quantum circuit, and that the quantity must be equally sensitive to errors in the quantum circuit physical implementation.

As described above, in some implementations the system may repeatedly sample subsets of quantum gates and repeatedly estimate corresponding fidelities for quantum circuits defined by the subsets of quantum gates. By repeatedly estimating fidelities for the quantum circuits, the system is able to increase the reliability of the fidelity estimate and reduce the likelihood of systematic errors or correlations affecting obtained results. As a simple example, by repeatedly estimating fidelities, the system is able to determine that the quantum hardware is functioning as intended.

Figure 4:
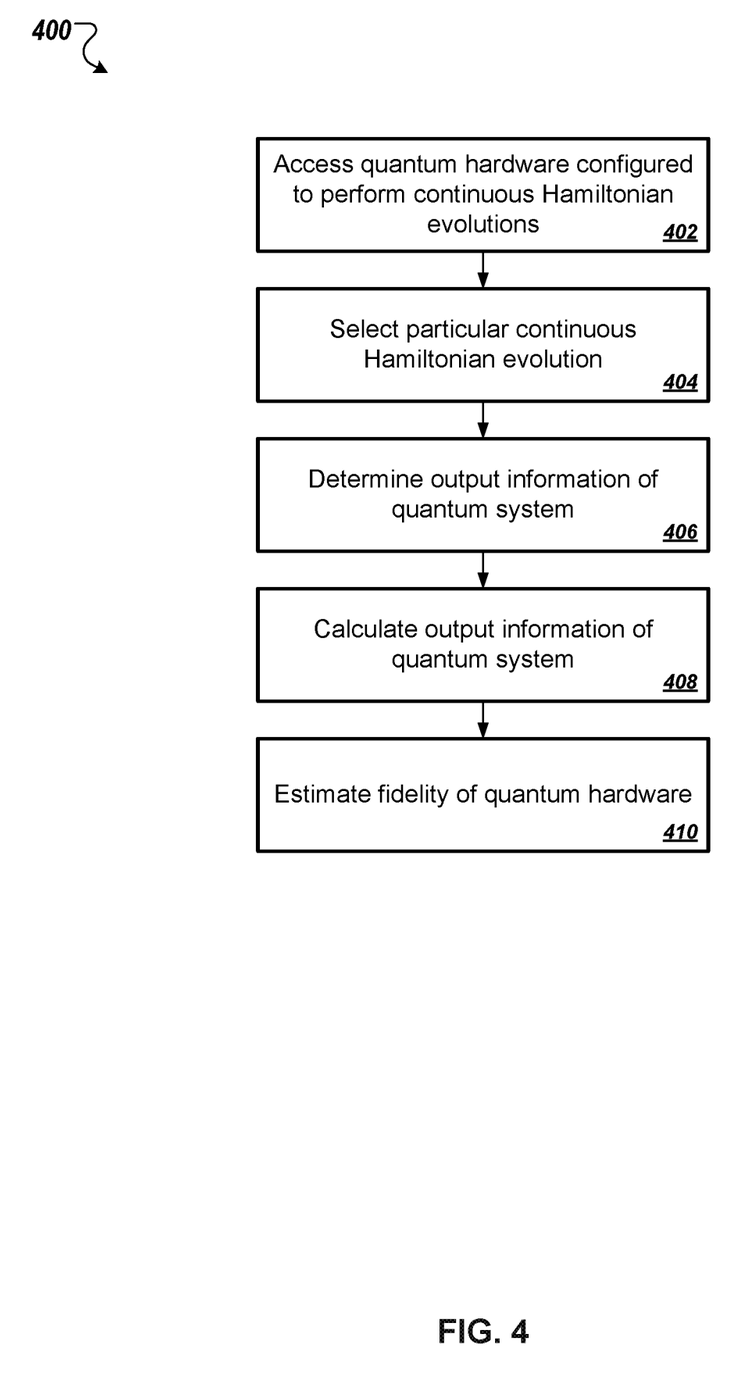
FIG. 4 is a flow diagram of an example process for benchmarking the fidelity of quantum hardware.

FIG. 4 is a flowchart of an example process 400 for benchmarking the fidelity of quantum hardware. For convenience, the process 400 will be described as being performed by a system of one or more classical or quantum computing devices located in one or more locations. For example, a quantum computing system, e.g., the quantum computing system 150 of FIG. 1B, appropriately programmed in accordance with this specification, can perform the process 400.

The system accesses quantum hardware (step 402). The quantum hardware may be configured to perform one or more different continuous Hamiltonian evolutions, as described above with reference to FIG. 1B. Each continuous Hamiltonian evolution may be associated with a respective quantum hardware fidelity.

The system selects a particular continuous Hamiltonian evolution (step 404). For example, the system may select one or more components that are configured to implement a particular Hamiltonian that determines a unitary operator that defines an evolution of the quantum system on which it is applied. In some cases the system may randomly select a particular continuous Hamiltonian evolution.

In some implementations the system may repeatedly select continuous Hamiltonian evolutions. For example, in some cases the quantum hardware may be configured to perform one or more different continuous Hamiltonian evolutions on one or more interacting qubits where each qubit interaction has an associated respective fidelity. In these cases, the system may repeatedly select continuous Hamiltonian evolutions that include interactions of comparable fidelity. By selecting continuous Hamiltonian evolutions including qubit interactions of comparable fidelity, the system is able to improve the consistency of the results obtained by the process 400 and avoid large systematic errors.

The system performs the selected continuous Hamiltonian evolution of a quantum system and performs measurements on the quantum system to determine output information of the quantum system (step 406). For example, the system may include or otherwise access a quantum system, e.g., a quantum system including one or more qubits as illustrated in FIG. 1B, and repeatedly perform the selected continuous Hamiltonian evolution by selecting one or more corresponding components that implement a Hamiltonian which gives rise to a unitary operator that defines the evolution of the quantum system, as described above with reference to FIG. 1B. For each evolution of the quantum system, the system may perform respective measurements on the quantum system and use the measurement results to determine output information of the quantum system.

As described above, in some implementations the system may repeatedly select continuous Hamiltonian evolutions. In such cases the system may repeatedly performs each selected continuous Hamiltonian evolution of the quantum system and performs respective measurements on the quantum system to determine respective output information of the quantum system for the selected continuous Hamiltonian evolutions.

The system calculates output information of the quantum system based on performing the selected continuous Hamiltonian evolution on the quantum system (step 408). For example, the system may use available computing technology, e.g., classical computing technology, to calculate the output information of the quantum system after the selected continuous evolution of the quantum system.

The system estimates a fidelity of the quantum hardware based on the determined output information and the calculated output information of the quantum system (step 410). The system may estimate the fidelity of the quantum hardware by fitting the determined output information of the quantum system to the calculated output information of the quantum system. The system may fit the results of performing the measurements in step 406 to a statistical mixture of (i) the output information of the quantum system based on performing the selected continuous Hamiltonian evolution on the quantum system as calculated in step 408, and (ii) a totally mixed quantum state. Fitting determined output information of a quantum system to calculated output information of the quantum system to estimate a fidelity of quantum hardware is described in more detail below with reference to FIG. 5.

In cases where the system repeatedly selects continuous Hamiltonian evolutions, the system fits the respective determined output information for the quantum system to the respective calculated output information of the quantum system to estimate a respective fidelity of each quantum hardware corresponding to a respective selected continuous Hamiltonian evolution. The system may repeatedly select continuous Hamiltonian evolutions until completion of an event, e.g., when an uncertainty of an estimated fidelity is below a predetermined threshold. By increasing the number of repetitions, the uncertainty of the estimated fidelity may be reduced, e.g., following an inverse square root law in the number of repetitions, to a desired threshold of certainty.

Figure 5:
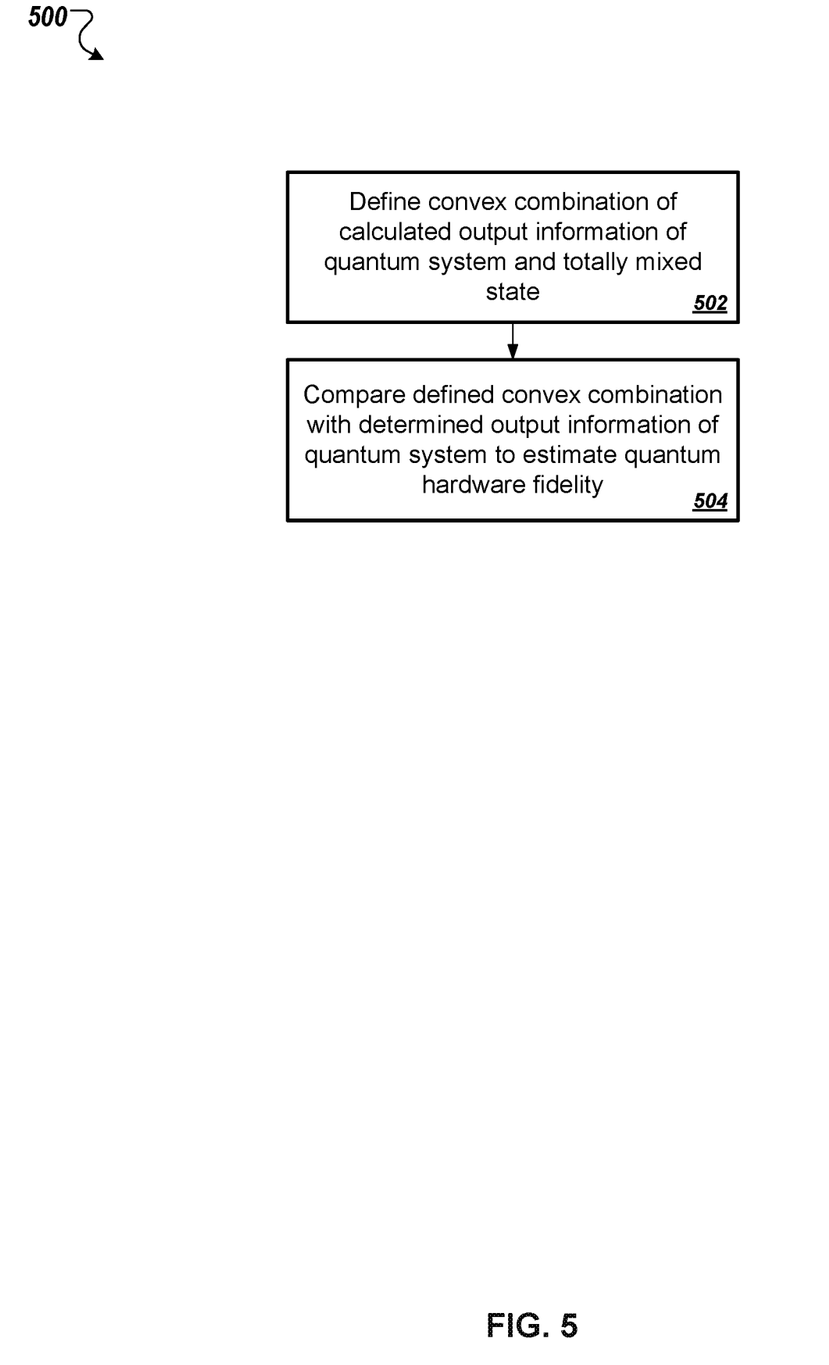
FIG. 5 is a flow diagram of an example process for fitting determined output information of a quantum system to calculated output information of the quantum system to estimate a fidelity of a quantum hardware.

FIG. 5 is a flowchart of an example process 500 for fitting determined output information of a quantum system to calculated output information of the quantum system to estimate a fidelity of a quantum hardware. For convenience, the process 500 will be described as being performed by a system of one or more classical or quantum computing devices located in one or more locations. For example, one or more classical processors, e.g., classical processors 104 of FIG. 1, appropriately programmed in accordance with this specification, can perform the process 500.

The system defines a convex combination of the calculated output information of the quantum system described above with reference to step 408 of FIG. 4 and a totally mixed quantum state (step 502). For example, the convex combination may be given by equation (1) below.

$$\rho = \alpha |\psi\rangle\langle\psi| + (1 - \alpha)\frac{\mathbb{I}}{N} \quad (1)$$

In equation (1), α represents the fidelity of the quantum circuit, $|\psi\rangle$ represents a calculated quantum state of the quantum system based on performing the continuous Hamiltonian evolution on the quantum system, and $\mathbb{I}/N$ represents the totally mixed state with N a dimension of the Hilbert space containing $|\psi\rangle$.

The system estimates the fidelity of the quantum hardware by comparing the defined convex combination in equation (1) with the determined output information of the quantum hardware described above with reference to step 406 of FIG. 4 (step 504). For example, the system may estimate the fidelity of the quantum hardware by comparing the defined convex combination with the determined output information of the quantum system and solving for the parameter α.

As described above, in some implementations the system may repeatedly select continuous Hamiltonian evolutions and repeatedly estimate corresponding fidelities for the quantum hardware corresponding to the continuous Hamiltonian evolutions. By repeatedly estimating fidelities for the quantum hardware, the system is able to increase the reliability of the fidelity estimate and reduce the likelihood of systematic errors or correlations affecting obtained results. As a simple example, by repeatedly estimating fidelities, the system is able to determine that the quantum hardware is functioning as intended.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, e.g., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, e.g., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible. The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, e.g., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method comprising:
accessing a set of quantum gates;
sampling a subset of quantum gates from the set of quantum gates, wherein the subset of quantum gates defines a quantum circuit;
applying the quantum circuit to a quantum system and performing measurements on the quantum system to determine output information of the quantum system;
calculating output information of the quantum system based on application of the quantum circuit to the quantum system; and
estimating a fidelity of the quantum circuit based on the determined output information and the calculated output information of the quantum system, comprising fitting the determined output information of the quantum system to the calculated output information of the quantum system, wherein fitting the determined output information of the quantum system to the calculated output information of the quantum system to estimate the fidelity of the quantum circuit comprises:
defining a convex combination of the calculated output information of the quantum system and a totally mixed quantum state; and
estimating the fidelity of the quantum circuit by comparing the defined convex combination with the determined output information of the quantum system.

2. The method of claim 1, wherein the convex combination is given by $$\rho = \alpha|\psi\rangle\langle\psi| + (1-\alpha)\frac{\mathbb{1}}{N}$$

wherein $\alpha$ represents the fidelity of the quantum circuit, $|\psi\rangle$ represents a calculated quantum state of the quantum system based on application of the quantum circuit to the quantum system, and $\mathbb{1}/N$ represents the totally mixed state.

3. The method of claim 1, further comprising:
repeatedly sampling a subset of quantum gates from the set of quantum gates until completion of an event, wherein each subset of quantum gates defines a respective quantum circuit;
for each sampled subset of quantum gates:
applying the respective quantum circuit to a quantum system and performing respective measurements on the quantum system to determine output information of the quantum system;
calculating output information of the quantum system based on application of the respective quantum circuit to the quantum system; and
estimating a fidelity of the respective quantum circuit based on the determined output information and the calculated output information of the quantum system.

4. The method of claim 3, wherein the completion of the event occurs when an uncertainty of an estimated fidelity is below a predetermined threshold.

5. The method of claim 1, wherein the set of quantum gates comprises a universal set of quantum gates.

6. The method of claim 1, wherein the set of quantum gates comprise single qubit quantum gates and two qubit quantum gates.

7. The method of claim 1, wherein each gate in the set of quantum gates is associated with a respective quantum gate fidelity.

8. The method of claim 7, wherein the sampled subset of quantum gates comprises a same number of quantum gates of comparable respective quantum gate fidelity.

9. The method of claim 1, wherein sampling a subset of quantum gates from the set of quantum gates comprises randomly sampling a subset of quantum gates from the set of quantum gates.

10. An apparatus comprising:
quantum hardware comprising:
one or more qubits;
one or more quantum gates;
one or more measurement devices;
one or more classical processors in data communication with the quantum hardware;
wherein the quantum hardware and the one or more classical processors are configured to perform operations comprising:
accessing a set of quantum gates;
sampling a subset of quantum gates from the set of quantum gates, wherein the subset of quantum gates defines a quantum circuit;
applying the quantum circuit to a quantum system and performing measurements on the quantum system to determine output information of the quantum system;
calculating output information of the quantum system based on application of the quantum circuit to the quantum system; and
estimating a fidelity of the quantum circuit based on the determined output information and the calculated output information of the quantum system, comprising fitting the determined output information of the quantum system to the calculated output information of the quantum system, wherein fitting the determined output information of the quantum system to the calculated output information of the quantum system to estimate the fidelity of the quantum circuit comprises:
defining a convex combination of the calculated output information of the quantum system and a totally mixed quantum state; and
estimating the fidelity of the quantum circuit by comparing the defined convex combination with the determined output information of the quantum system.

11. The apparatus of claim 10, wherein the one or more qubits are superconducting qubits.

12. The apparatus of claim 10, wherein the one or more qubits form a one dimensional array.

13. The apparatus of claim 10, wherein the one or more qubits form a two dimensional array.

14. The apparatus of claim 10, wherein each of the one or more qubits are subject to nearest neighbor interactions.

\* \* \* \* \*